United States Patent [19]

Anderson

[11] 4,175,354
[45] Nov. 27, 1979

[54] PLANT GROWING DEVICE

[76] Inventor: Clarence A. Anderson, 724 Beechnut La., Martinsville, Va. 24112

[21] Appl. No.: 689,564

[22] Filed: May 24, 1976

[51] Int. Cl.² .................. A47G 7/02; A01G 27/00
[52] U.S. Cl. .................................... 47/39; 47/79; 211/1.5; 222/214; 417/476
[58] Field of Search .............. 222/207, 214; 417/474, 417/476, 478; 47/79, 82, 39; 211/1.5; 239/17

[56] References Cited

U.S. PATENT DOCUMENTS

| | | | |
|---|---|---|---|
| 267,689 | 11/1882 | Hoak | 239/17 |
| 764,307 | 7/1904 | Schahill | 47/39 |
| 792,806 | 6/1905 | Wolke | 211/1.5 |
| 1,008,348 | 11/1911 | Mann | 211/1.5 X |
| 1,885,117 | 11/1932 | Lemert | 47/82 |
| 2,188,875 | 1/1940 | Ellis | 47/62 |
| 2,685,985 | 8/1954 | Howell, Jr. | 222/207 X |
| 2,856,101 | 10/1958 | Jermette | 222/214 X |
| 2,909,125 | 10/1959 | Daniels | 222/214 X |
| 3,168,797 | 2/1965 | Patassy | 47/79 |
| 3,360,885 | 1/1968 | St. Clair | 47/39 UX |
| 3,837,433 | 9/1974 | Combs, Jr. et al. | 417/476 X |
| 3,958,366 | 5/1976 | Meyers | 47/81 |
| 3,992,809 | 11/1976 | Chew | 47/62 |
| 4,026,067 | 5/1977 | Wengel | 47/39 |
| 4,051,627 | 10/1977 | Schilling, Jr. | 47/39 |

FOREIGN PATENT DOCUMENTS

| | | | |
|---|---|---|---|
| 18026 | of 1887 | United Kingdom | 47/79 |
| 118744 | 9/1918 | United Kingdom | 47/39 |
| 968489 | 9/1964 | United Kingdom | 47/39 |

*Primary Examiner*—Edgar S. Burr
*Assistant Examiner*—Steven A. Bratlie
*Attorney, Agent, or Firm*—Lane, Aitken & Ziems

[57] ABSTRACT

A plant growing device includes a two sectional base having an upper and a lower portion, wherein a mechanism is provided for the controlled rotation of the upper portion relative to the stationary lower portion, and a flower pot containing a plant is positioned on top of the upper portion. A mechanism for delivering a controlled supply of water is coupled to the mechanism for rotation.

3 Claims, 3 Drawing Figures

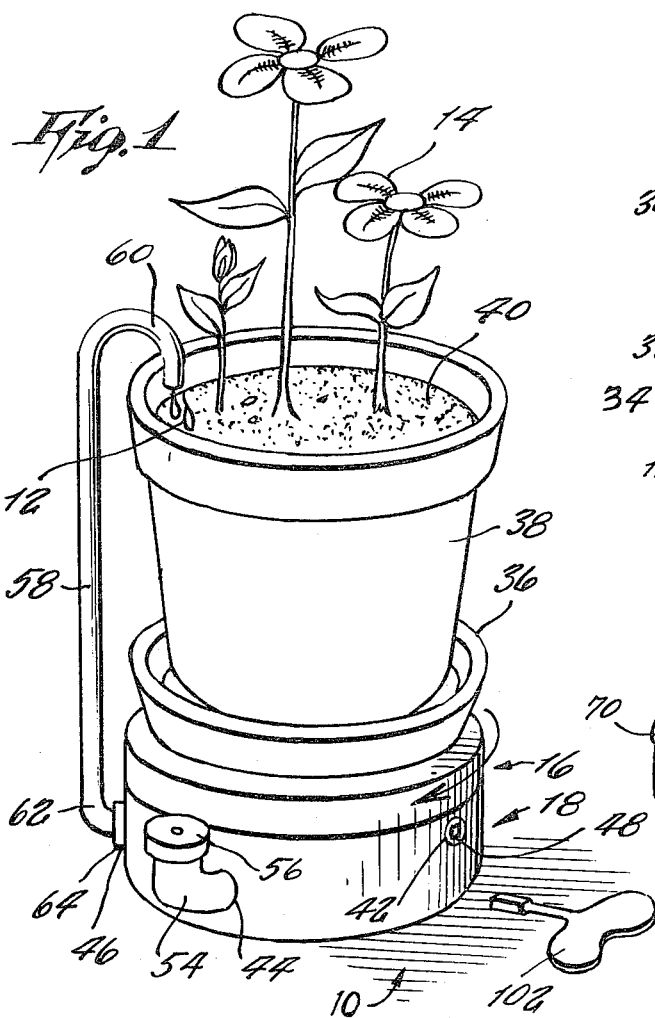
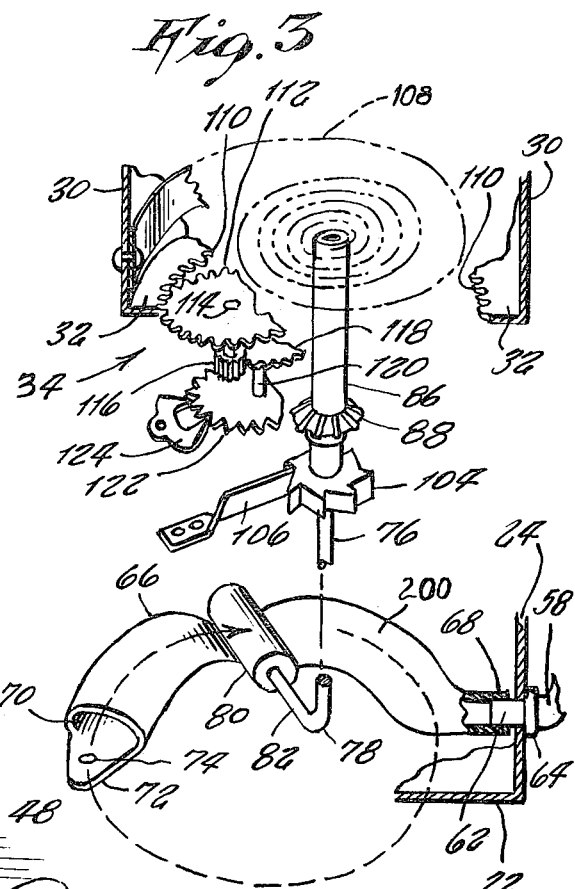
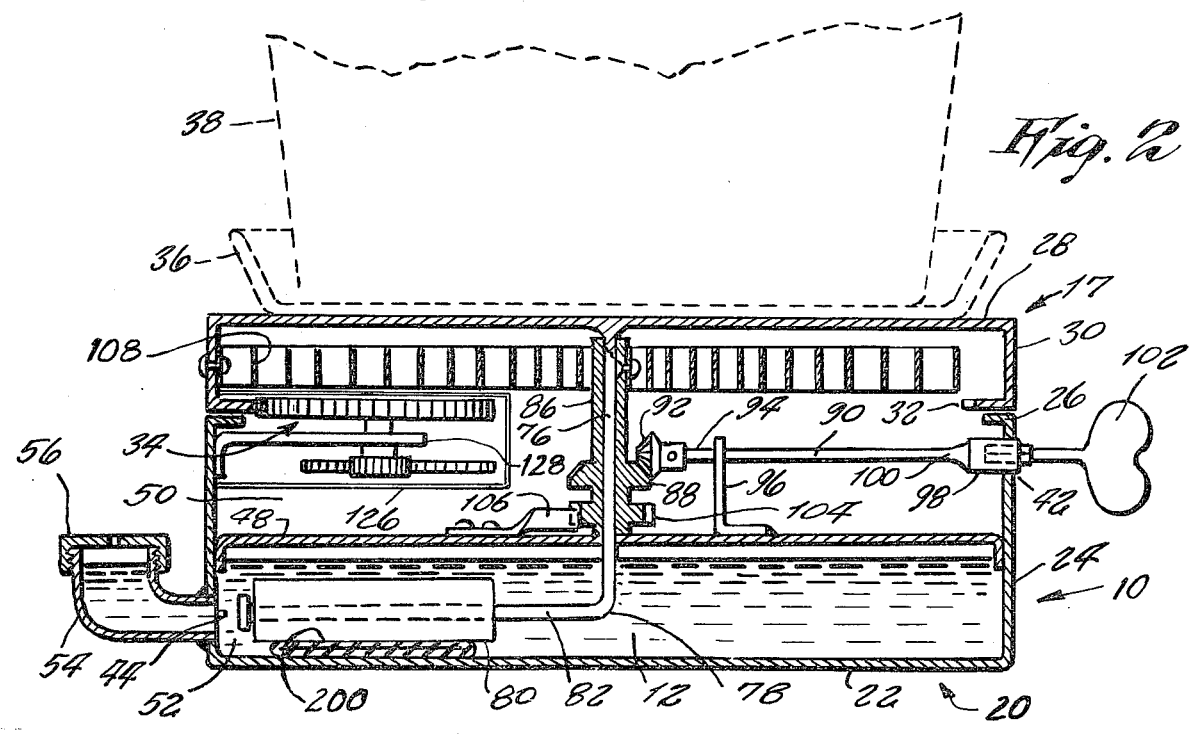

PLANT GROWING DEVICE

SUMMARY OF THE INVENTION

My present invention relates to a unique and novel plant growing device designed to deliver a controlled supply of water as well as to keep the plants under controlled rotation, thereby preventing unsymmetrical growth of the plant.

U.S. Pat. No. 1,885,117 to L. Lemert relates to a revolving plant rack designed for watering and supporting a plant. However, this patent is of an unnecessarily complicated design and does not provide a means for continuously rotating the plants. U.S. Pat. No. 1,468,247 to W. Patten relates to a rotating table, wherein the rotation means does not correspond to the present application. U.S. Pat. No. 2,939,330 to G. P. Margetts relates to a machine for rotating signs and displays which is non-applicable to the present application. U.S. Pat. No. 3,360,885 to M. W. St. Clair relates to a rotating flower pot; however this patent fails to provide a means for continuous water or the rotation means of the present application. U.S. Pat. No. 3,882,634 to R. D. Dedolph relates to rotary rack used for plant growth which is non-applicable to my present invention.

An object of my present invention is to provide a plant growing device which will promote symmetrical plant growth.

A further object of my present invention is to provide a means for delivering a supply of a predetermined amount of water to a plant undergoing controlled rotation.

Briefly, my device comprises a two sectional base having an upper and a lower portion, wherein a mechanism is provided for the controlled rotation of the upper portion relative to the stationary lower portion, and a flower pot containing a plant is positioned on top of the upper portion. A mechanism for delivering a controlled supply of water is coupled to the mechanism for rotation.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a perspective front view of a plant watering device;

FIG. 2 illustrates a side cross-sectional view of the plant watering device; and FIG. 3 illustrates a cutaway view of clock assembly of the plant watering device.

DESCRIPTION OF THE PREFERRED EMBODIMENT

Turning now descriptively to the drawings, in which similar reference characters denote similar elements throughout the several views, FIGS. 1-3 show a plant watering device 10 which delivers a charge of water 12 to plants 14 as well as to cause the plants 14 to undergo continuously rotation. The device 10 comprises a two sectional base having an upper 16 and lower 18 portion. The housing 20 of the lower portion 18 includes a base 22, an upwardly extending cylindrically shaped wall 24, and an annular flange 26 depending inwardly from an upper edge of wall 24. The upper portion 16 includes a housing 17 having a top 28, a downwardly extending cylindrically shaped wall 30, and an annular flange 32 extending inwardly from a lower edge of wall 30. The upper portion 16 rotates with respect to the stationary lower portion 18. This rotation is effected through a clock assembly shown generally as 34 in FIG. 2. A dish shaped member 36 is positioned on the top 28 of upper portion 16. A flower pot 38 is received within the dish member 36, wherein flowers 14 are grown in dirt 40. The housing 20 has an intermediate horizontally placed wall 48 which divides the interior of housing 20 into upper 50 and lower 52 chambers, wherein the lower chamber 52 is adapted to receive a supply of water 12 therein. An L-shaped water inlet tube 54 having a screw type end cap 56 is sealed into an opening 44 through sidewall 24 such that tube 54 communicates with lower chamber 52. An elongated tube member 58 has a hooked end 60 and an L-shaped end 62, wherein L-shaped end 62 extends inwardly through an opening 46 opening in sidewall 24 and is sealed within the opening by a gasket member 64. Tube member 58 extends vertically upward such that hooked end 60 extends inwardly over pot 38.

A flexible elongated tubular shaped member 66 has a pair of open ends 68, 70 as shown in FIG. 3, wherein end 68 is affixed onto end 62 of member 58 within the lower chamber 52 such that the tubular shaped member 66 lays on the upper surface of base 22 of housing 20. A tab member 72 is included on the other end 70 of tubular member 66, wherein the tab member 72 is anchored to base 22 by any suitable anchoring element 74, such as a nail. One arm 76 of an L-shaped rod element 78 is affixed centrally to the under surface of the top 28 of upper 17, wherein arm 76 extends downwardly through housing 17 into the lower chamber 52 of housing 20. A roller member 80 is rotatably mounted on the other arm 82 of rod element 78, wherein roller member 80 engages an upper surface 200 of tubular member 66. When upper base portion 16 rotates with respect to stationary lower base portion 18, the roller member 80 prescribes a 360° arc within lower chamber 52 due to the rotation of rod element 78 in conjunction with upper portion 16. Water 12 seeps into the tubular member 66 through end 70. As roller member 80 rotates, it compresses a portion of tubular member 66 forcing water 12 upwardly through tube member 58. When the water 12 in lower chamber 52 is gone, the water supply can be replenished in the lower chamber 52 by injecting water through water inlet tube 54.

Shown generally for illustrative purposes is a clock assembly 34 for the purpose of causing the rotation of upper base portion 16 with respect to stationary lower portion 18. It is understood that other gear assemblies or a simple wind-up mechanism could readily be employed. The clock assembly 34 comprises a tubular sleeve member 86 affixed onto arm 76 of rod 78, wherein the sleeve member 86 extends between the lower side of the top 28 of housing 17 and horizontal intermediate wall 48. A first beveled gear 88 is affixed onto tubular member 86. A horizontally placed elongated rod 90 is contained within the upper chamber 50 of lower base section 18, wherein a second beveled gear 92 is affixed onto one end 94 of rod 90, wherein the two beveled gears 88, 92 cooperate with each other. The rod 90 is mounted for rotation in an L-shaped bracket 96 which is anchored onto wall 48. A key chuck 98 is affixed onto the other end 100 of rod 90, wherein chuck 98 extends into aperture 42. A key member 102 detachably inserts into chuck 98. A ratchet 104 is affixed onto tubular member 86 below first beveled gear 88. A pawl 106 is anchored to an upper surface of wall 48, wherein pawl 106 engages ratchet 104. A leaf spring 108 is anchored at one end to tubular member 86 and at the other end to an inside surface of wall 30. The inside periphery of annular flange 32 has a plurality of gear teeth 110 thereon, wherein the flange 32 is an internal gear. A first spur clock gear 112 is mounted for rotation on a vertically placed pinion 114, wherein gear 112 meshes with gear teeth 110. A first spur clock wheel 116 is mounted on pinion 114 below gear 112. A second spur clock wheel 118 is mounted for rotation on a second vertically placed pinion 120, meshes with spur clock wheel 116. An escape wheel 122 is mounted also for rotation on pinion 120. A pallet 124 is anchored to the housing 126 for the clock assembly 34 which is contained within the upper compartment 50, wherein the pallet 124 engages escape wheel 122. The two pinions 114, 120 are mounted for rotation on bracket member 128 which is anchored to housing 126.

Since obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A device for promoting plant growth by rotating a plant container and delivering water to a plant within said container, comprising:
   (a) a base having an upper section and a lower section, said upper section being rotatably disposed with respect to said lower section;
   (b) means for controllably rotating said upper section relative to said lower section;
   (c) water supply containment means including a chamber defined in said lower section by a horizontally-disposed intermediate wall dividing the interior of said lower section into upper and lower chambers, said lower chamber containing a supply of water therein; and means for replenishing the water in said lower chamber; and
   (d) means cooperating with said rotating means for delivering water from said containment means to said plant container, said water delivering means comprising:
   (a) a water delivery tube extending externally of said plant container and having one end extending into said water supply containment means, the other end of said tube terminating at a point adjacent to said plant container such that water is delivered to said plant;
   (b) a flexible elongated tubular member disposed within said water supply containment means, one end of said tubular member being anchored to said water containment means so that said water has free access to the interior of said tubular member, and the other end of said tubular member being attached in a fluid-communicating manner to the end of said delivery tube extending into said water supply containment means;
   (c) a roller member in rotatable depressing engagement with the upper, outer surface of said tubular member to compress the area of said tubular member below said roller to provide pressure for forcing said water through said tubular member into said water delivery tube; and
   (d) means coupling said roller member to said rotatable upper section such that said roller member depresses said tubular member during rotational movement of said upper section.

2. A device according to claim 1, wherein said means for controlling rotation further comprises:
   (a) an L-shaped rod member having one arm affixed centrally to the lower surface of the top of said upper section, and the other arm being horizontally disposed to support said roller member within said water supply containment means;
   (b) a tubular sleeve member attached to the vertical arm of said L-shaped rod member;
   (c) a ratchet attached to said tubular sleeve member;
   (d) a pawl engaging said ratchet, said pawl being anchored to said water supply containment means;
   (e) a spring with one end affixed to said tubular sleeve member, the other end of said spring being anchored to said upper section;
   (f) means for rotating said tubular sleeve member to wind said spring;
   (g) gear teeth disposed adjacent to the periphery of said upper section; and
   (h) a gear train assembly communicating with said gear teeth.

3. A device according to claim 2, wherein said means for rotating said tubular sleeve member comprises:
   (a) a first beveled gear affixed onto said tubular sleeve member;
   (b) a horizontally-disposed elongated rod extending through said lower section;
   (c) a second beveled gear affixed to one end of said elongated horizontally-disposed rod, said first and said second beveled gears meshing together; and
   (d) a key chuck affixed to the other end of said elongated horizontally-disposed rod, said chuck extending outwardly through said lower section.

* * * * *